(12) United States Patent
Jetté

(10) Patent No.: US 7,864,030 B2
(45) Date of Patent: Jan. 4, 2011

(54) SAFETY SYSTEM FOR TRUCKS

(75) Inventor: Gaétan Jetté, Mascouche (CA)

(73) Assignee: 9172-9863 Québec Inc., Terrebonne, Quebec (CA)

( * ) Notice: Subject to any disclaimer, the term of this patent is extended or adjusted under 35 U.S.C. 154(b) by 338 days.

(21) Appl. No.: 12/228,568

(22) Filed: Aug. 14, 2008

(65) Prior Publication Data

US 2009/0045929 A1 Feb. 19, 2009

(30) Foreign Application Priority Data

Aug. 14, 2007 (CA) .................................. 2596250

(51) Int. Cl.
*G08B 21/00* (2006.01)
*B60Q 1/00* (2006.01)

(52) U.S. Cl. .................. 340/431; 340/438; 340/457; 340/687; 340/686.2; 340/686.4

(58) Field of Classification Search .................. 340/431
See application file for complete search history.

(56) References Cited

U.S. PATENT DOCUMENTS

| 4,432,563 | A | * | 2/1984 | Pitcher ........................ 280/477 |
|---|---|---|---|---|
| 4,830,563 | A | * | 5/1989 | Yeakle ......................... 414/401 |
| 5,894,673 | A | * | 4/1999 | Pretsch, Jr. .................... 33/286 |
| 6,010,287 | A | * | 1/2000 | Sommermeyer et al. .... 410/144 |
| 6,222,457 | B1 | * | 4/2001 | Mills et al. ............... 340/686.1 |
| 6,431,819 | B1 | * | 8/2002 | Hahn ......................... 414/809 |
| 2002/0024430 | A1 | * | 2/2002 | Schutt et al. ................ 340/431 |
| 2009/0027178 | A1 | * | 1/2009 | Rebsch ....................... 340/431 |

* cited by examiner

*Primary Examiner*—Julie Lieu
(74) *Attorney, Agent, or Firm*—Eric Fincham

(57) ABSTRACT

A system for encouraging the use of a load stabilizer in a cargo carrying vehicle comprising a storage device which has a detector, the detector being adapted to sense the presence or absence of a stabilizing member such as a shoring bar, the detector being designed to emit a first signal upon sensing the presence of the stabilizing member and to emit a second signal upon sensing the absence of the stabilizing member. The signal could activate or trigger a visual or audio indicator or alternatively the signal will allow or prevent an action being taken.

15 Claims, 2 Drawing Sheets

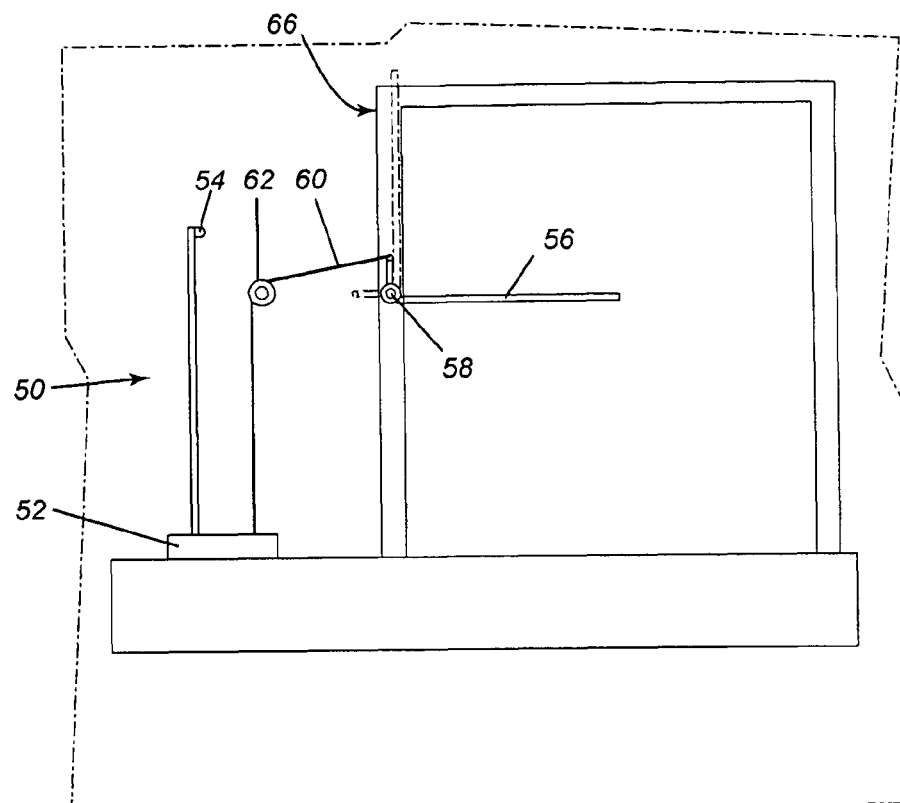
*FIG. 2*
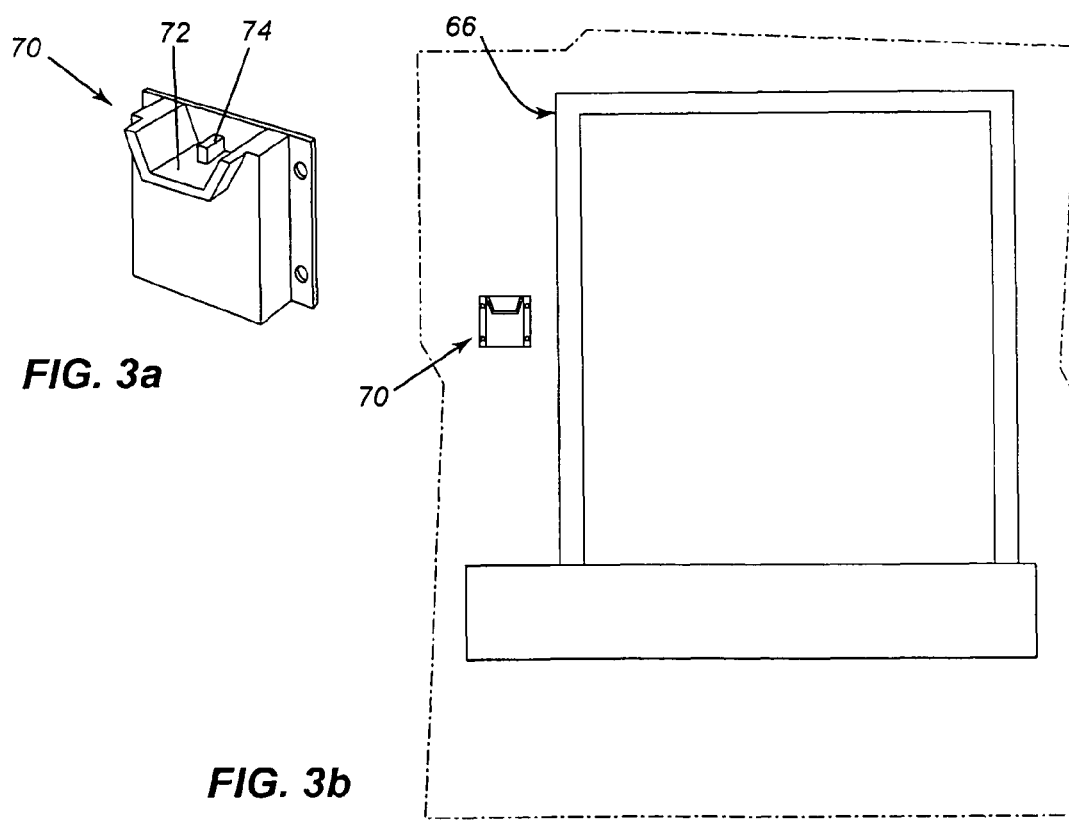
*FIG. 3a*
*FIG. 3b*

SAFETY SYSTEM FOR TRUCKS

FIELD OF THE INVENTION

The present invention relates to a safety system for trucks and more particularly, relates to a method and system for ensuring the use of stabilizing devices.

BACKGROUND OF THE INVENTION

When driving a cargo carrying vehicle such as a truck or tractor trailer, one of the hazards present is that of a shifting load. When navigating a corner or turn, and particularly at high speed, if the load is not stable, it can shift to one side and cause the driver to lose control or for the vehicle to tip over on its side. Naturally, either outcome can be disastrous and the safety of both the driver of the truck or trailer and other vehicles in the immediate vicinity can be jeopardized.

Regulations in North America require that cargo in trucks and trailers must be secured prior to travelling on the road. Thus, Section 393.100 of the United States Federal Motor Carrier Safety Administration requires that "each commercial motor vehicle must, when transporting cargo on public roads, be loaded and equipped, and the cargo secured, in accordance with this Section to prevent the cargo from leaking, spilling, blowing or falling from the motor vehicle". The same regulation requires that "cargo must be contained, immobilized or secured in accordance with this Section to prevent shifting upon or within the vehicle to such an extent that the vehicle's stability or manoeuverability is adversely affected".

Similarly, regulations in Canada require that "a driver shall not operate a vehicle where the cargo transported in or on the vehicle is not contained, immobilized or secured in accordance with this standard".

The most commonly used means to secure the cargo of a closed trailer is a transverse bar held against each side wall by friction or by a more positive type of locking mechanism. A plurality of such transverse bars may be required at different locations within the trailer. While such bars, known as shoring bars (also known as stabilizing or load locking bars) are well accepted within the transport industry, events can arise which prevent the use of the same.

Thus, one may leave the bar at the far end of the trailer prior to loading. When the loading of the pallets or similar material is completed, the bar is inaccessible and frequently the driver will neglect to secure the load.

Another frequent occurrence is when after loading the trailer (or unloading) the personnel in charge forget the bar against the wall in the shipping area. As schedules are tight, the driver will often leave the loading dock unknowingly without having secured the load.

Other means of stabilizing the load can be utilized. This can include the use of inflatable members or the like to occupy the space between the load and rear or side of the vehicle.

SUMMARY OF THE INVENTION

It is an object of the present invention to provide a method and system for ensuring the use of a stabilizing apparatus in a load carrying vehicle.

According to one aspect of the present invention, there is provided a system for encouraging the use of a load stabilizer in a cargo carrying vehicle, the system comprising a storage device, the storage device having a detector, the detector being adapted to sense the presence or absence of a stabilizing member, the detector being designed to emit a first signal upon sensing the presence of the stabilizing member and to emit a second signal upon sensing the absence of stabilizing member.

The method and system of the present invention are utilized to ensure that the driver and/or other workers of the vehicle is aware of the need to take certain actions regarding the stabilizing apparatus. To this end, there is provided a device for temporary storage of the shoring bar and which device has the capability of sensing the presence of the same and triggering a signal to a different location which may be utilized to take a second action. The second action may comprise an audio or visual signal or alternatively, the action can alert the driver or other worker. Still further, the signal may ensure that another piece of equipment (such as the dock leveller) is not capable of operating.

In such a system, the stabilizing apparatus is placed in a storage device which is designed to detect the presence of the stabilizing apparatus. Though this can be achieved in different manners, a preferred embodiment of the invention wherein a shoring bar is used comprises an arrangement wherein the shoring bar is stored in a vertical position with a weight detector (such as limit switch) located in the bottom and a proximity sensor or other type of detector located at the top. Since the bar is fairly long, this arrangement can help prevent the system from being defeated by a human placing his weight on the weight sensor.

The upper sensor may be a proximity sensor or alternatively, could be a metal sensor. It suffices to say that any sensor which can detect the presence of the shoring bar can be utilized.

When the stabilizing apparatus is other than a shoring bar, an appropriate type of sensor or detector may be utilized with the concept remaining the same—i.e. a detector detects the presence or absence of the stabilizing device and will emit a signal. As aforementioned, the signal may be of an audio or visual type or alternatively, may comprise a signal to a further device to permit or not to permit a certain action to be taken.

In operation, the driver of the vehicle and/or other workers, after pulling into a loading/unloading facility, will remove the shoring bar and place it in the storage device. When the presence of the shoring bar is detected, a signal can be sent to a remote device to indicate the presence of the same. The signal could trigger, for example, a light, a flag or other visual indicator. Alternatively, and in a preferred embodiment, the signal will allow or prevent an action being taken. Thus, the signal could be operative with the dock leveller and could allow activation of the same for a limited period of time. While it can be the dock leveller or any other means like a barrier or door that would prevent access to the vehicle may be used.

Upon departing, a second signal is sent to either a visual indicator or to allow some action to take place. Thus, the signal could be utilized to prevent the driver from taking a certain action until such time as the bar is removed.

In a further embodiment, one could utilize a completely mechanical system wherein the weight of the shoring bar could activate a gate or other barrier. Thus, when the bar is not present, a gate could move to block access; when the bar is placed in the bar holder, the gate would be activated to a stored position. Suitable cables, rods and pulleys could be utilized.

The device, in one embodiment, would function as follows. Initially, the driver would back the trailer to a loading dock and optionally, a vehicle restraint can be set. A dock leveller control is unable at this point in time to be operated. If there is a non powered mechanical dock leveller, any attempt to set the same would trigger an alarm to advise of an unsafe situation.

The driver will then remove the stabilizer device and place it on the storage device. The system then senses the presence of the stabilizer and enables the dock leveller control such that the dock leveller can be operated for a predetermined period of time. After the time has passed, if the operator wants to operate the dock leveller, he will be unable to do so or alternatively, an alarm would sound.

To enable the control, the stabilizer has to be removed from the storage device. This permits the dock leveller to be operated. Subsequently, a vehicle restraint, if used, can be released and the vehicle may then depart.

BRIEF DESCRIPTION OF THE DRAWINGS

Having thus generally described the invention, reference will be made to the accompanying drawing illustrating an embodiment thereof, in which:

FIG. 2 is a schematic view of a second embodiment of the present invention; and

FIGS. 3a and 3b are schematic views of a shoring bar holder switch.

DETAILED DESCRIPTION OF THE INVENTION

Figure 1:
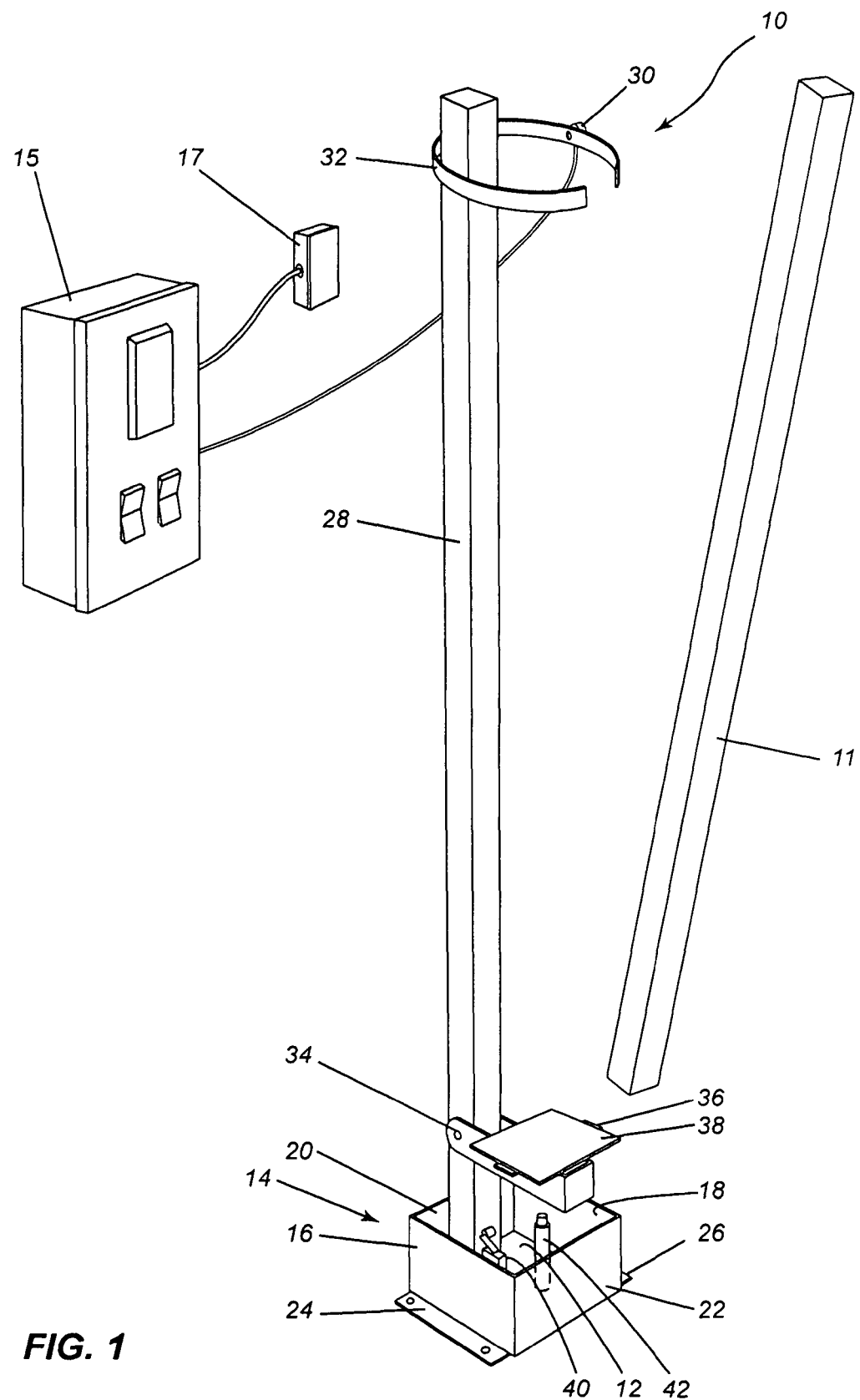
FIG. 1 is a perspective exploded view of a device according to one embodiment of the present invention.

Referring to the drawing in greater detail and by reference characters thereto, the shoring bar sensing device is indicated generally by reference numeral 10.

Device 10 includes a base plate 12 and a housing 14 mounted thereon. Housing 14 includes a pair of side walls 16, 18 and end walls 20, 22. As will be seen, angle irons 24, 26 may be utilized for mounting device 10 to a substrate.

Extending upwardly from housing 14 is an upright 28 which has, mounted at the top end thereof, a detector 30 for detecting the presence of one end of a shoring bar 11. In this respect, a support bracket 32 may be utilized to cradle the shoring bar end.

Situated proximate the lower end of the device is a U-shaped pivotable member 34 having bar 36 and upper plate 38 mounted thereon. Mounted interiorly of housing 14 is a limit switch 40 and a stopper arrangement 42.

As previously mentioned, device 10 functions when shoring bar 11 is placed on upper plate 38, its presence is detected both at the lower portion and upper extremity. A control mechanism 15 is utilized to send a signal via interface 17 to a remote device to indicate the presence of the same. Similarly, removal of the shoring bar will also trigger a reaction at a remote device.

In operation, the driver taxies a trailer to a loading dock (not shown) having a dock leveller control. The driver will remove the shoring bar 11 and place it in storage device 10. This then sends a signal through control mechanism 15 and then to interface 17 to permit the dock leveller to operate for a period of time (typically 5 or 10 minutes). After this period of time, the dock leveller is inactivated and remains in the desired position.

When leaving, the stabilizer is removed from the storage device and a signal is sent to permit the dock leveller to be operated for a given period of time. The driver, having the stabilizer in his hands, will then utilize the same in the vehicle.

In the embodiment of FIG. 2, there is provided a sensing device generally designated by reference numeral 50. Sensing device 50 has a base 52 and a shoring bar holder 54.

A loading dock door 66 is illustrated and access thereto may be prevented by means of a gate 56 shown in the down or blocking position. Gate 56 is connected at a pivot point 58 with a cable 60 being operative to raise or lower the gate 56.

As illustrated in FIG. 2, the gate may be moved to an up position or unblocking position as shown in dotted lines and designated by reference numeral 64. A cable 60 is entrained about pulley 62 which extends into base 52. There may be employed different means for activating pulley 62 including mechanical and/or electrical means. Thus, the weight of the bar could be utilized or alternatively, a sensor as in the previous embodiment could be employed.

A switch 70 is illustrated in FIG. 3 and will include a bar support 72 and a suitable sensing mechanism 74 for operating the switch.

It will be understood that the above described embodiment is for purposes of illustration only and that changes and modifications may be made thereto without departing from the spirit and scope of the invention.

I claim:

1. A system for encouraging the use of a load stabilizer in a cargo carrying vehicle, the system comprising:
    a storage device for storing said load stabilizer;
    said storage device having a detector, said detector being adapted to sense the presence or absence of said load stabilizer, said detector being designed to emit a first signal upon sensing the presence of said stabilizing member and to emit a second signal upon sensing the absence of stabilizing member.

2. The system of claim 1 further including an interface module, said interface module being designed to receive said first and second signals and to initiate an action upon receipt of the signals.

3. The system of claim 2 wherein said interface is designed to allow activation of a dock leveller for a predetermined period of time upon receipt of said first signal.

4. The system of claim 3 wherein said interface will allow activation of said dock leveller for a predetermined period of time upon receipt of said second signal.

5. The system of claim 4 further including a plurality of sensors associated with said detector.

6. The system of claim 2 wherein said first signal activates an audio signal.

7. The system of claim 2 wherein said first signal activates a visual signal.

8. The system of claim 2 wherein said first signal is linked to activation/deactivation of a further device.

9. The system of claim 2 wherein said second signal activates an audio signal.

10. The system of claim 2 wherein said second signal activates a visual signal.

11. The system of claim 2 wherein said second signal causes activation/deactivation of a further device.

12. The system of claim 2 wherein said load stabilizer comprises a shoring bar.

13. The system of claim 12 wherein said detector comprises a weight sensor.

14. The system of claim 12 wherein said detector also includes a proximity sensor.

15. A method for encouraging the use of a load stabilizer in a cargo carrying vehicle, the method comprising the steps of:
    supplying a storage device having a detector;
    placing said load stabilizer in said storage device to cause a first signal to be emitted and which first signal will cause a first action to be taken; and
    removing said load stabilizer from said storage device to cause said detector to emit a second signal, said second signal permitting an action to be taken to allow the vehicle to depart.

* * * * *